April 3, 1928.
H. N. SMITH
WATER SOFTENER
Filed March 3, 1927
1,664,435
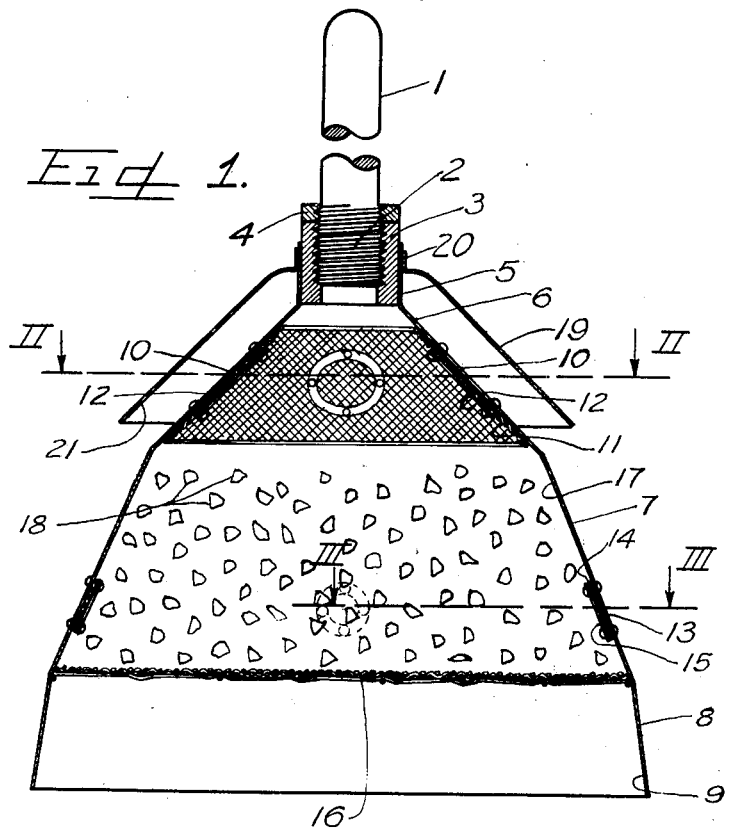
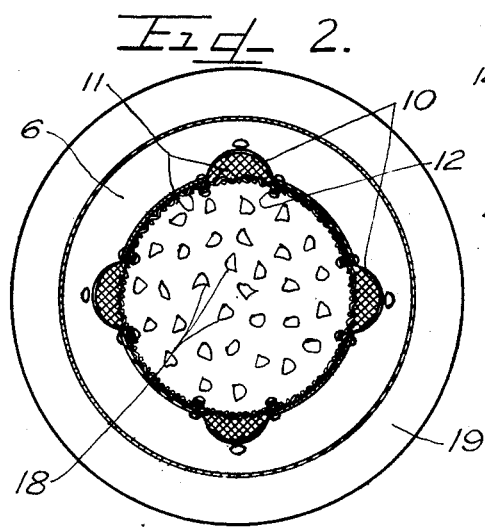
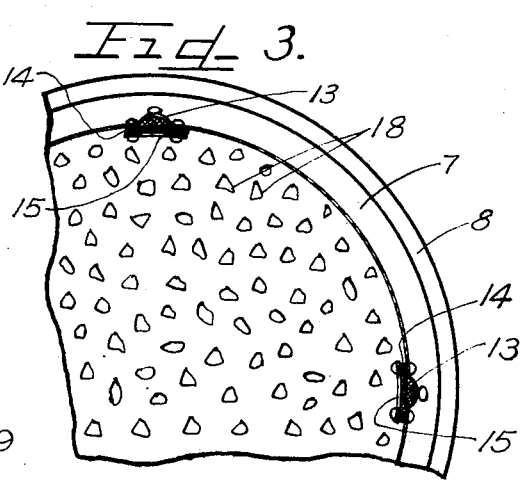
Inventor
Howard N. Smith
by Charles N. Hill
Attys.

Patented Apr. 3, 1928.

1,664,435

UNITED STATES PATENT OFFICE.

HOWARD N. SMITH, OF OAK PARK, ILLINOIS.

WATER SOFTENER.

Application filed March 3, 1927. Serial No. 172,267.

This invention relates to a water softening device constructed to permit the same to be conveniently plunged into water to move a water softening mineral therethrough and, furthermore, permitting the water to move upwardly and then downwardly through the mineral as the device is withdrawn. The water is adapted to be moved through the mineral by pressure created by confining a quantity of water in a small space on the downstroke of the device and causing a suction action to be created through holes in the device by employing an outer hood which partially covers one end of the main container of the device.

It is an object of this invention to provide an apertured plunger type device for softening water, said device containing a confined softening mineral adapted to be first moved under pressure through the water and then permitting the water to move through the mineral to thoroughly agitate the same to produce the desired softening of the water.

It is also an object of this invention to provide a water softening device having a bell shaped or conical apertured and screened container adapted to hold a softening mineral, said container having associated therewith a spaced hood adapted on the retraction of the device to create a vacuum suction action.

It is a further object of this invention to provide a plunger type of water softener embracing a conical type container provided with a plurality of sets of screened apertures of different sizes and with a spaced outer hood associated with one of said sets of screened apertures to create a suction on the upstroke of the device and preventing the water passing through the device on the downstroke from splashing out through the set of large screened apertures.

It is an important object of this invention to provide a water softener having a main container so shaped to permit the water to be confined rapidly, but which will not allow the softening mineral to be confined by pressure from below so rapidly as to stop the flow of water therethrough, thereby affording an arrangement whereby water may be rapidly softened by permitting water to pass upwardly through the mineral on the downstroke of the device and furthermore creating a suction action on the upstroke, allowing the water to still circulate upwardly through the mineral until the suction action is broken thereby causing the mineral particles to be thoroughly agitated and rolled to expose all surfaces thereof to the action of the water to provide an efficient and rapid water softener.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal section through a water softener embodying the principles of this invention showing parts broken away.

Figure 2 is a transverse sectional view taken on line II—II of Figure 1.

Figure 3 is an enlarged fragmentary transverse section of the main container taken on line III—III of Figure 1.

As shown on the drawings:

The improved water softener is of the plunger type, operable by means of a handle or stick 1, the lower end of which is threaded at 2 and removably engaged in an internally threaded sleeve or filler socket 3. A lock nut or washer 4 is engaged on the outer end of the threaded portion 2 and seats against the end of the sleeve 3 to hold the handle locked in place. The sleeve or socket 3 has one end thereof rigidly secured in a collar or sleeve 5 integrally formed on the upper end of a bell shaped or frustum shaped container or casing consisting of a reduced upper frustum shaped body section 6, an intermediate frustum shaped body section 7, and a lower frustum shaped body section 8, the lower end of which is open to permit water to readily pass into the lower chamber 9 provided in said lower casing section 8 when the device is put into use.

The upper conical casing section 6 is provided with a circumferential ring or row of large apertures 10 all of which are closed by means of an inner frustum shaped or conical screen 11 which seats against the inner surface of the upper casing section 6 and is held in place by means of retaining rings 12 or other suitable means. The intermediate conical section 7 is provided with a circumferential row of smaller openings 13 each of which is closed on its inner side by means of an individual screen 14 held in place by means of a retaining ring 15. Mounted transversely across the interior of the casing between the casing sections 7 and 8 is a retaining screen 16 which separates the lower chamber 9 from the tapered chamber 17 provided in the casing sections 6 and 7 and adapted to hold a quantity of water softening mineral particles 18. The mineral 18 is adapted to be fed into the container through the passaged socket or sleeve 3 when the handle 1 is removed. It will be noted that the threaded end 2 of the handle acts as a plug for closing the sleeve 3 so that the mineral particles within the chamber 17 are prevented from escaping from the container by the retaining screen 16 and the screens 11 and 14, closing the large apertures 10 and the smaller apertures 13, respectively.

A suction producing device forms a part of the water softener and comprises an outer frustum shaped hood or cone 19 the upper restricted end of which is provided with a circular flange 20 which fits around the casing collar 5 and is rigidly secured thereto by any suitable means to hold the conical hood over the upper casing section 6 and spaced therefrom to afford a recess or jacket 21 around the upper section of the casing.

The operation is as follows:

By removing the handle 1 from the socket 3 a suitable water softening mineral 18 is adapted to be deposited in the casing chamber 17 upon the main retaining screen 16. After filling the device the handle is put back into place and the water softener is ready for use. By gripping the handle 1 the water softener is adapted to be pushed or plunged into a body of water which is to be softened. The downward movement of the water softener through the water causes the mineral within the chamber 17 to be moved downwardly through the water, thereby tending to produce a softening action on the water passing upwardly through the device first entering the chamber 9 and then passing through the main screen 16 through the restricted chamber 17 and out through the lower screened openings 13 and the larger upper screened openings 10 in the upper restricted casing section 6. The water passing out of the screened aperture openings 10 enters the hood chamber 21 and is then directed downwardly around the outside of the casing sections 7 and 8. It will thus be noted that a somewhat circular path is followed by the water passing upwardly through and out of the apertured screened casing.

After a downward movement of the device the device is moved upwardly by means of the handle 1. As the device is pulled upwardly or retracted the water which fills the hood chamber 21 on the downstroke of the device is permitted to escape through the lower end of the hood so that a vacuum or suction action is created within the hood 19, causing the water in the device to continue to move upwardly and pass out of the openings 10 and 13. The hood 19 on the downstroke of the device acts to prevent splashing of the water through the openings 10 and deflects the water downwardly around the exterior of the container and furthermore serves as a shield for preventing objects from moving into direct contact with the screen 10 to damage the same. With the upstroke of the device the hood 19 affords a means whereby a vacuum action is created therein to facilitate the passage of the water upwardly through the mineral particles. It will thus be noted that the device does not displace water with the mineral particles, but forces the water between said particles creating a circulation in the body of water to be softened so that the softening action is efficient and is adapted to be produced in a comparatively short time. Due to the pressure created on the mineral particles by the downstroke of the device in the water said mineral particles are caused to roll or be moved to expose all the free surfaces thereof to the action of the water, while on the upstroke of the device the water is caused to continue to travel upwardly through the container until the hood is withdrawn from the body of water to break the vacuum or suction action at which time the water in the container will move downwardly out of the bottom of the container thereby reversing the direction of movement of the mineral particles within the chamber 17 to still further carry on the softening of the water.

The degree of softening of a body of water depends upon the length of time the water softener is used in the body of water. In certain cases it may only be necessary to plunge the device into the water once and then retract the same, while in other cases where the water is extremely hard the same may require a number of operations of the device to produce the desired softening of the water.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A water softener comprising a conical casing having a plurality of sets of openings, a main screen positioned transversely in said casing to retain a mineral therein, a handle in one end of said casing to permit operation of the same, and a hood engaged over one end of said casing and spaced therefrom.

2. A water softening device comprising a conical casing having a plurality of openings therein, screens for closing said openings, a socket at one end of said casing to permit mineral particles to be deposited in the casing, a main screen in said casing for supporting the mineral particles, a handle removably engaged in said socket to close the opening therein and afford a means for operating the device, and a vacuum producing means mounted above said casing to facilitate the water softening action produced by the device when in operation.

3. A water softening device comprising an upper casing section, an intermediate casing section, and a lower casing section all connected one to the other, said upper casing section and said intermediate casing section having a plurality of openings therein, screens for closing said opening, a main screen separating said intermediate casing section from said lower casing section, a socket secured to said upper casing section adapted to permit a water softening material to be deposited in said upper and intermediate casing sections upon said main screen, a handle removably engaged in said socket, and a hood secured on said socket over said upper casing section and spaced therefrom.

4. A water softening device comprising a conical casing having a plurality of openings therein, screens for closing said openings, a mineral supporting partition in said casing below said opening, a handle on said casing, and a suction producing hood supported on said handle and spaced from one end of said casing.

5. A water softening device of the class described comprising a handle, a pair of concentric conical casings supported thereon in superimposed spaced relation one of said casings having a plurality of openings therein, and screens in said apertured casing for closing said openings and for holding a water softening material within said casing.

6. A water softening device of the class described comprising an apertured casing, screens in said casing for closing the apertures therein, a main retaining screen partitioning the interior of said casing to retain a water softening mineral therein, and a hood supported above and spaced from said casing.

7. A water softening device comprising a casing having a plurality of sets of openings of different size therein, screens for closing said openings, a main screen positioned transversely in said casing below said openings adapted to coact with the screens closing said openings to retain a water softening substance within a portion of said casing, and means connected with said casing to facilitate operation thereof.

8. A water softening device comprising a casing constructed of a plurality of connected frustum shaped sections, apertures in certain of said sections, screens for closing said apertures, a main screen partitioning said casing into a plurality of chambers, means for actuating the casing, and a frustum shaped hood supported on said means in spaced relation from one end of said casing.

9. A water softening device comprising a casing having a plurality of openings therein, means for retaining a water softening mineral in said casing, and a hood surrounding and spaced from said casing to facilitate the water softening action of the device.

10. A water softening device comprising an apertured casing having plurality of openings therein, screens closing said openings, a screen partition in said casing to provide a plurality of chambers one of which is adapted to hold a water softening substance, a sleeve on said casing to permit the water softened material to be supplied to the casing, a handle removably engaged in said sleeve to close the same after a fitting operation, means for holding the handle locked in position, and a vacuum producing hood supported on said sleeve in spaced relation over one end of said casing.

11. A water softening device comprising a screened apertured casing, a handle for operating the same, and a hood supported on said handle in spaced relation over one end of said casing.

In testimony whereof I have hereunto subscribed my name at Chicago, Cook County, Illinois.

HOWARD N. SMITH.